United States Patent [19]
Jenkner

[11] Patent Number: 5,042,633
[45] Date of Patent: Aug. 27, 1991

[54] ROLLER BEARING DEVICE FOR WORKPIECE TRANSFER PLATFORMS

[76] Inventor: Erwin Jenkner, Linden Strasse 13, Gechingen, Fed. Rep. of Germany, D-7261

[21] Appl. No.: 474,351

[22] Filed: Feb. 2, 1990

[30] Foreign Application Priority Data

Feb. 4, 1989 [DE] Fed. Rep. of Germany ....... 3903371

[51] Int. Cl.$^5$ .............................................. B65G 13/00
[52] U.S. Cl. ................................................. 193/35 SS
[58] Field of Search ........... 193/35 SS, 35 MD, 35 C; 198/782, 457

[56] References Cited
U.S. PATENT DOCUMENTS

| | | | |
|---|---|---|---|
| 3,394,822 | 7/1968 | Bethke | 198/782 |
| 3,557,975 | 1/1971 | Amerio . | |
| 3,642,113 | 2/1972 | Burgis | 198/25 |
| 3,645,379 | 2/1972 | Kornylak | 198/127 |
| 4,738,345 | 4/1988 | Jenkner | 193/35 C |
| 4,819,554 | 4/1989 | Fleischer et al. | 193/355 SS |

FOREIGN PATENT DOCUMENTS

| | | |
|---|---|---|
| 2355143 | 5/1974 | Fed. Rep. of Germany . |
| 3129388 | 3/1983 | Fed. Rep. of Germany . |
| 3232764 | 6/1984 | Fed. Rep. of Germany . |
| 3400686 | 7/1985 | Fed. Rep. of Germany . |
| 796092 | 1/1981 | U.S.S.R. .......................... 193/35 SS |
| 1303506 | 4/1987 | U.S.S.R. .......................... 193/35 SS |

Primary Examiner—Joseph S. Valenza
Attorney, Agent, or Firm—Dick and Harris

[57] ABSTRACT

A roller bearing device for use with workpiece plate transfer platforms including one or more support rails, each support rail having a longitudinal groove with a longitudinal opening on the upper surface of the support rail. At least one roller support is seated in the longitudinal groove. The roller support includes an angled lever pivotably mounted on a support base. A roller is supported at the end of a first arm of the lever, with at least a portion of the roller positionable above the top surface of the support rail. The end of the second arm is articulated to an adjustment member, actuation of which causes the lever to pivot, raising or lowering the roller.

11 Claims, 10 Drawing Sheets

ROLLER BEARING DEVICE FOR WORKPIECE TRANSFER PLATFORMS

BACKGROUND OF THE INVENTION

The present invention relates to roller bearing devices for the mounting of support rollers in workpiece transport platforms having at least one support rail, with a longitudinal groove in the support rail and a longitudinal opening along the top surface of the support rail. In particular, the present invention relates to a roller bearing device which includes at least one roller support which is insertable into the longitudinal groove with a roller mounted in the roller support for rotation about an axis which extends perpendicular to the longitudinal groove.

Roller bearing devices having the above-mentioned general characteristics are known in the prior art and an example of such roller bearing devices may be found in U.S. Pat. No. 4,738,345, issued to Jenkner, on Apr. 19, 1988, claiming priority of German Pat. Apln. No. 3400686. The roller bearing device disclosed in these references forms a component of an assembly for the construction of workpiece transfer platforms which include a support rail having a longitudinal groove which opens upon the upper side of the support rail. By placing individual support rails next to one another, workpiece transfer platforms of desired length and breadth can be produced. In such workpiece transfer platforms, workpiece support strips may be inserted into the longitudinal grooves of the support rails, instead of roller supports, to provide a non-roller workpiece sliding platform. In order to assemble a workpiece transfer platform as described, roller supports, each rotatably supporting a roller, are inserted into the longitudinal groove of the support rails positioned adjacent one another. The rollers, supported for rotation about axes extending transversely to the longitudinal grooves, project above the top surfaces of the support rails. The upper portions of the rollers thereby define a common workpiece transfer plane.

If plate-shaped workpieces are to be transported in directions substantially perpendicular to one another with the prior art roller bearing device, then by using corresponding support rails, an additional workpiece transfer platform is provided. In this additional transfer platform, roller supports, in which the axes of the rollers extend parallel to the longitudinal grooves in the support rails, are arranged in the longitudinal grooves of the support rails arranged adjacent to one another. In such a configuration, the rollers are supported completely outside of and above the roller supports. Support rails having the just-described configuration of roller bearing devices, in the prior art, are then positioned between, and in alternating relation to, support rails having rollers supported on axes perpendicular to the longitudinal grooves of the support rails. This construction of a workpiece transfer platform makes it necessary that one of the sets of support rails be configured to be raised or lowered, in order to prevent a workpiece plate, during its transfer from one direction of travel to the other, substantially perpendicular direction, from coming into contact with the rollers of the receiving set of support rails, which could possible lead to damage to the workpiece plate, as well as the receiving workpiece transfer platform.

It is accordingly an object of the invention to provide a roller bearing device for use in a workpiece transport platform, which workpiece transfer platform includes one or more rollers rotatably mounted upon one or more support rails, wherein a workpiece plate being transported along a particular direction on a particular set of rollers can be transferred to a substantially perpendicular transport direction, along a subsequent set of roller bearing support rails, without having to construct one of the set of support rails in such a manner as to be able to be raised or lowered.

Another object of the present invention is to provide a roller bearing devices for a workpiece transfer platform having rollers which enable the workpiece transfer platform to be converted into a workpiece sliding platform without the necessity of having to remove the roller supports from the support rails and replacing them with workpiece support strips.

These and other object of the present invention will become apparent in light of the present Specification, Claims and Drawings.

SUMMARY OF THE INVENTION

The present invention comprises a roller bearing device for use as a component of a workpiece transfer platform, which platform includes at least one support rail having a groove extending along a longitudinal axis of said support rail, the groove including an opening along a top surface of the support rail, for the support and transfer of plate shaped workpieces. The roller bearing device comprises at least one roller support seated in the groove of the support rail. A roller is mounted in the roller support for rotation about an axis extending perpendicularly to the longitudinal groove of the support rail. At least a portion of the roller is positionable above the top surface of the support rail. Adjustment means are operably associated with the roller support for enabling the selective positioning of the roller upwardly or downwardly relative to a predetermined plane positioned above the top surface of the support rail.

The roller support comprises a pivot member operably associated with the adjustment means for pivoting about a axis parallel to the predetermined plane, upon actuation of the adjustment means. The roller is rotatably mounted upon a portion of the pivot member. The pivot member further comprises a lever having two arms. A first arm is positionable substantially parallel to the longitudinal axis and along the top surface of the support rail, with the first arm supporting the roller at its free end. A second arm is disposed substantially perpendicular to the first arm and extends substantially downwardly therefrom and the second arm is articulated to the adjustment means. The adjustment means further comprises an activating bar operably arranged in the groove of the support rail for displacement substantially parallel to the longitudinal axis.

Each roller support, in the preferred embodiment of the invention, is made up of a chassis divided along the direction of the longitudinal axis into two support halves operably joinable in cooperating mated relation to each other. The two support halves support the pivot member between them in a substantially freely pivotable manner.

In the preferred embodiment of the invention, the pivot member is a framework which is likewise divided along the direction of the longitudinal axis into two pivot member halves operably joinable in cooperating mated relation to each other. In turn, the pivot member halves support between them the roller, in a substantially freely rotatable manner.

The invention makes it possible to move the rollers of the roller bearing devices, which are positioned in a common longitudinal groove of the support rail, upward or downward by way of the adjusting element which is coordinated with the support rail. The rollers may be moved together from an upper support position, downwardly into a lower release position in a selective manner. Each of the roller supports may be further configured so that, upon actuation of the adjustment means, the rollers may be lowered, together, to a position below the top surface of the respective support rails. In this manner, a workpiece transfer platform having rollers may be converted into a workpiece sliding platform, without the need for replacing the roller supports with workpiece support strips.

In order to provide for a change in the direction of transfer of the workpiece plates, from a particular direction, to one substantially perpendicular thereto, two roller platforms may be provided, the rollers of which are arranged to be rotatable about axes perpendicular to one another. The two roller platforms may be connected in series, or arranged with the support rails of one roller platform alternating with the support rails of the other, with the top surfaces of all of the support rails in a common plane. If the construction of the present invention is used, a special platform lifting device is not necessary.

In order to provide for the transfer of plate-shaped workpieces in directions substantially perpendicular to one another without a special lifting platform, a first set of support rails may be provided, which are equipped with roller bearing devices according to the present invention. A second set of support rails are arranged in the same plane as the first set of support rails. In a preferred embodiment of the invention, the support rails of the second set are disposed in alternating relation to the rails of the first set. In the rails of the second set, roller bearing devices are inserted into the grooves, which include rollers, positioned above the top surface and rotatable about axes extending parallel to the longitudinal axes of the support rails. The rollers in the first set of rails, having axes of rotation perpendicular to the longitudinal axes of the respective support rails, will be raisable or lowerable above or below the horizontal plane defined by the first-mentioned set of rollers.

DETAILED DESCRIPTION OF THE DRAWINGS

While this invention is susceptible of embodiment in many different forms, there is shown in the drawings, and will be described in detail herein, a specific embodiment, with the understanding that the present disclosure is to be considered as an exemplification of the principles of the invention and is not intended to limit the invention to the embodiment illustrated.

Figure 1:
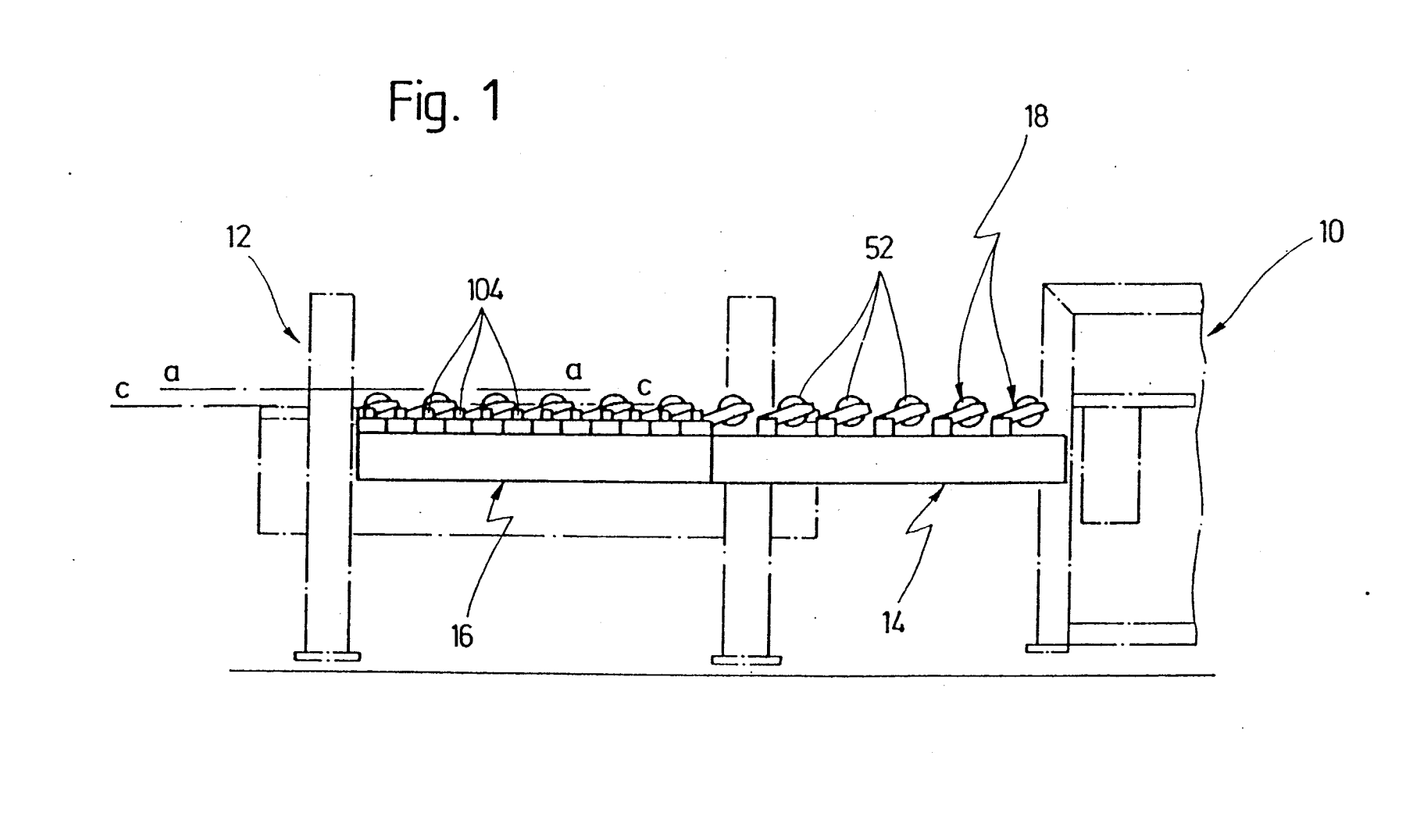
FIG. 1 is a side elevation of a workpiece transfer platform, incorporating the present invention, connecting two plate saws.
Figure 2:
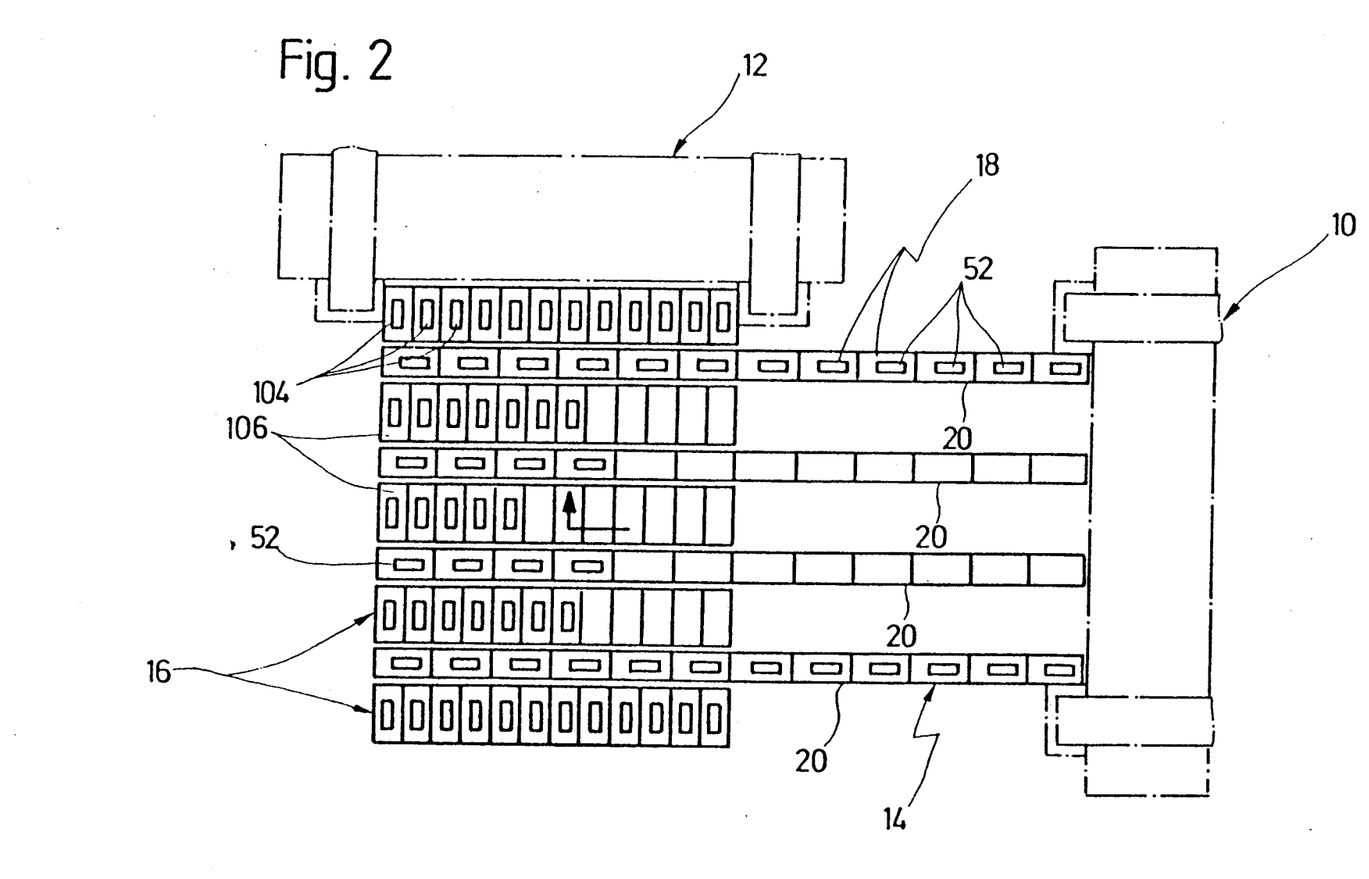
FIG. 2 is a top plan view, according to FIG. 1, showing the two plate saws connected by the workpiece transfer platforms.

A plate cutting apparatus is shown in FIGS. 1 and 2, which includes longitudinal plate saw 10, transverse plate saw 12, and workpiece transfer platforms 14 and 16, through which lateral transfer of plate parts accumulating in longitudinal saw 10 is made possible. Transfer platform 14 is equipped with roller supports 18 having operatively equivalent configurations, which may differ in the particulars of construction, from transfer platform to transfer platform. Roller supports 18, with vertically adjustable rollers 52, of transfer platform 14 enable plate parts accumulating on the discharge side of longitudinal plate saw 10 to be displaced parallel to the cutting plane of transverse plate saw 12 on transfer platform 16 thereof. On transfer platform 16, the plate parts can, in order to be transversely cut up, be displaced by means of roller supports 106, with vertically fixed rollers 104, perpendicularly to the cutting plane of transverse plate saw 12. A plate feeding device, which serves to propel the workpiece plates, or plate parts, along the transfer platforms, may be of known construction, and therefore has been omitted from the drawings for the sake of clarity.

Figure 8:
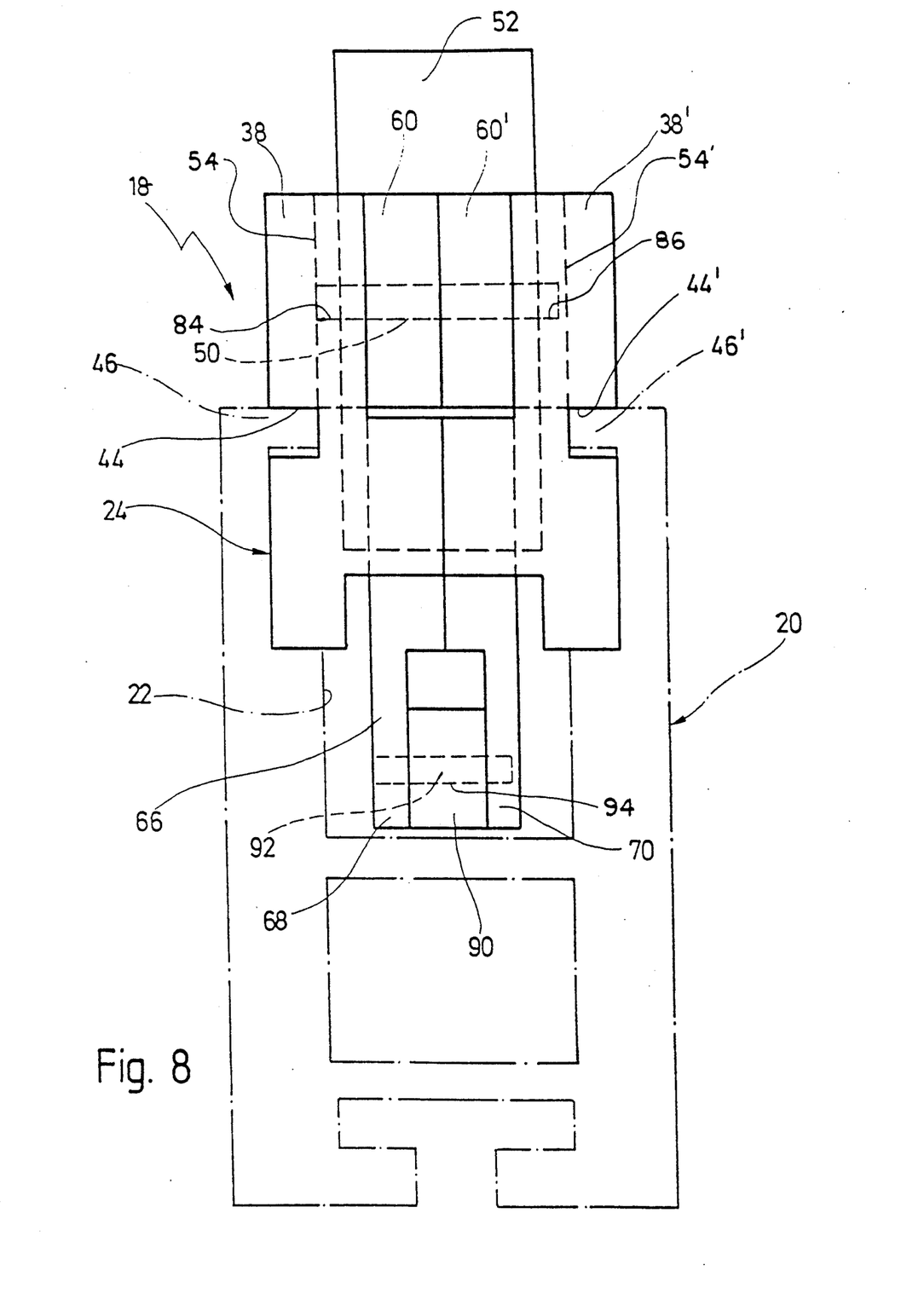
FIG. 8 of a roller bearing device, according to a preferred embodiment of the present invention, seen inserted within a support rail, the contours of which are shown in phantom.

Roller supports 18 are shown in FIG. 2 as being positioned in corresponding support rails 20, immediately behind one another along the longitudinal axis of each respective support rail 20. A front elevation of one of the support rails 20 is seen in FIG. 8, in phantom. Each support rail 20 includes longitudinal groove 22, which opens upon the top surface of support rail 20. Each roller support 18 is inserted into longitudinal groove 22, with support block 24 retaining roller support 18 within groove 22. Support rail 20 could also be provided with grooves extending perpendicular to the longitudinal axis of support rail 20, and parallel to each other. As shown in FIG. 2, support rails 20 are arranged in spaced, parallel relationship to each other, with the distances between support rails being substantially equal and large enough so that the support rails of transfer platform 16 can be inserted therebetween. The construction of the support rails of transfer platform 16 will be described hereinafter.

Figure 3:
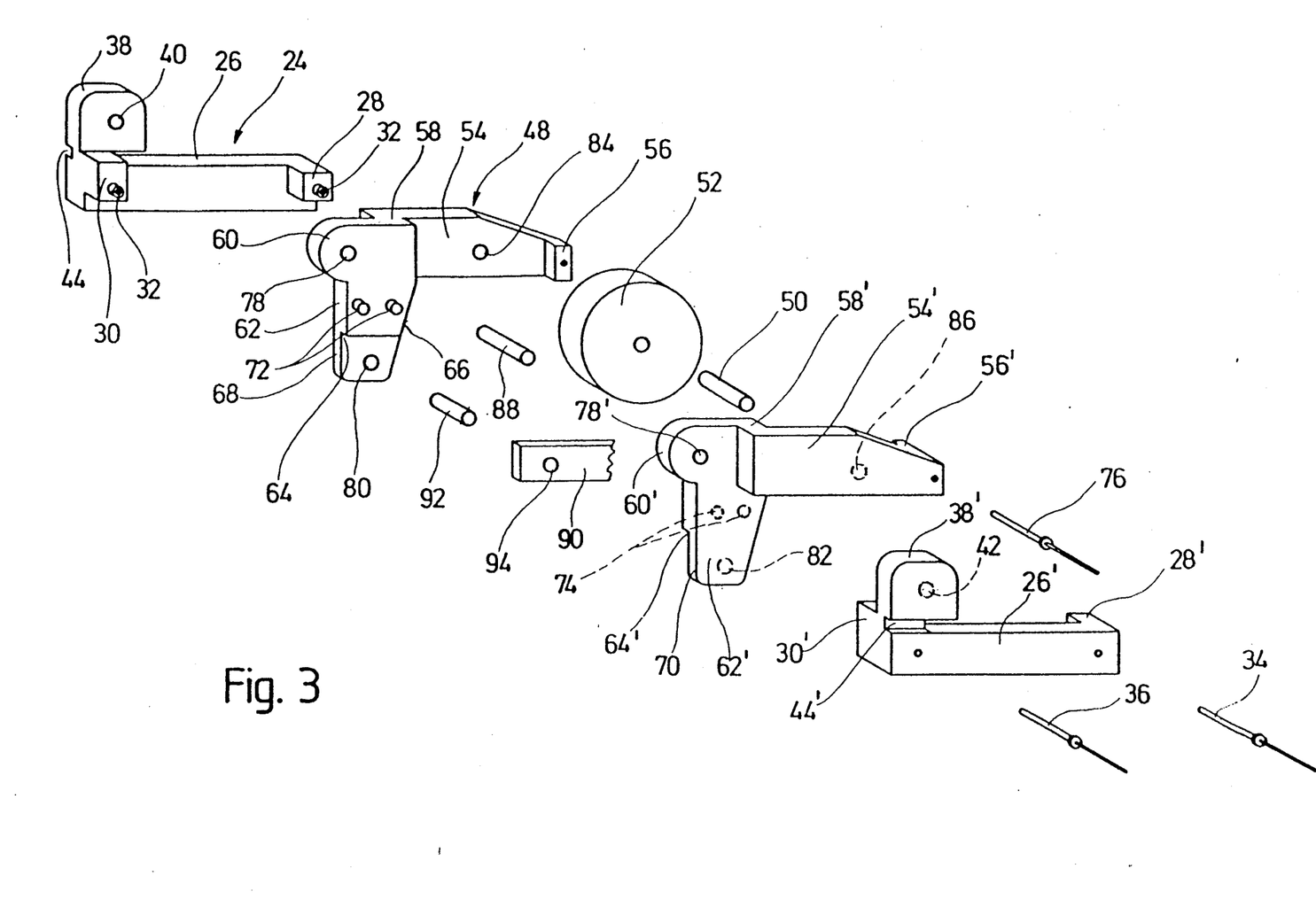
FIG. 3 is an isometric, exploded view of the roller support and roller assembly, according to a preferred embodiment of the invention.
Figure 6:
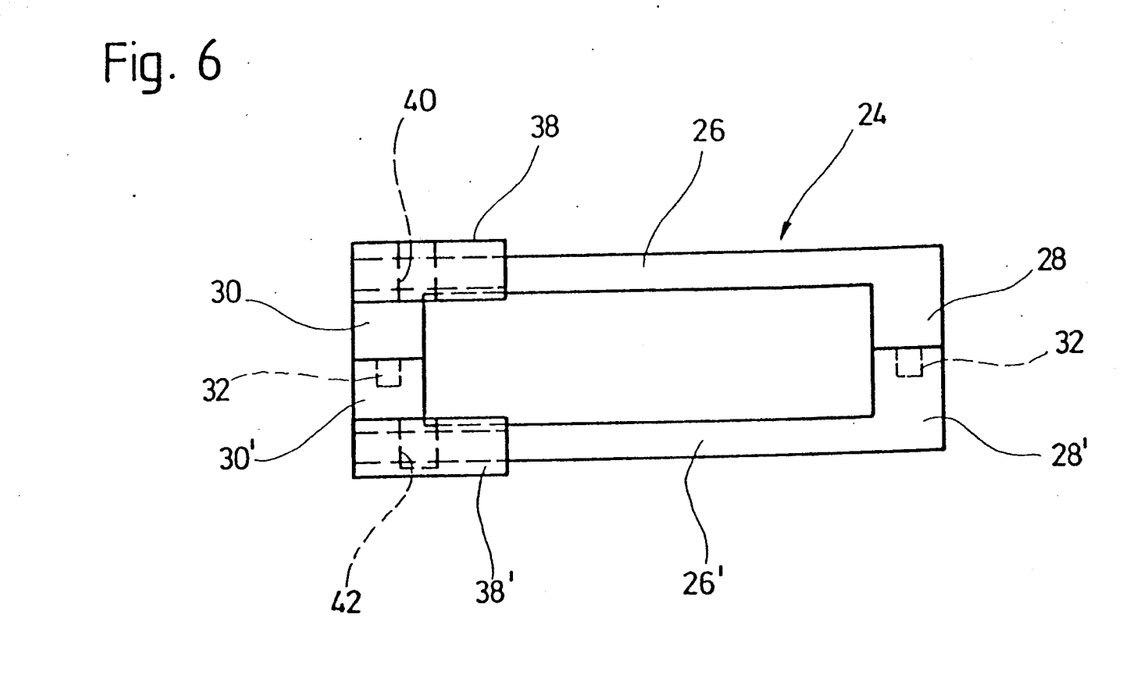
FIG. 6 is a top plan view of the roller support halves, in their assembled configuration.
Figure 7:
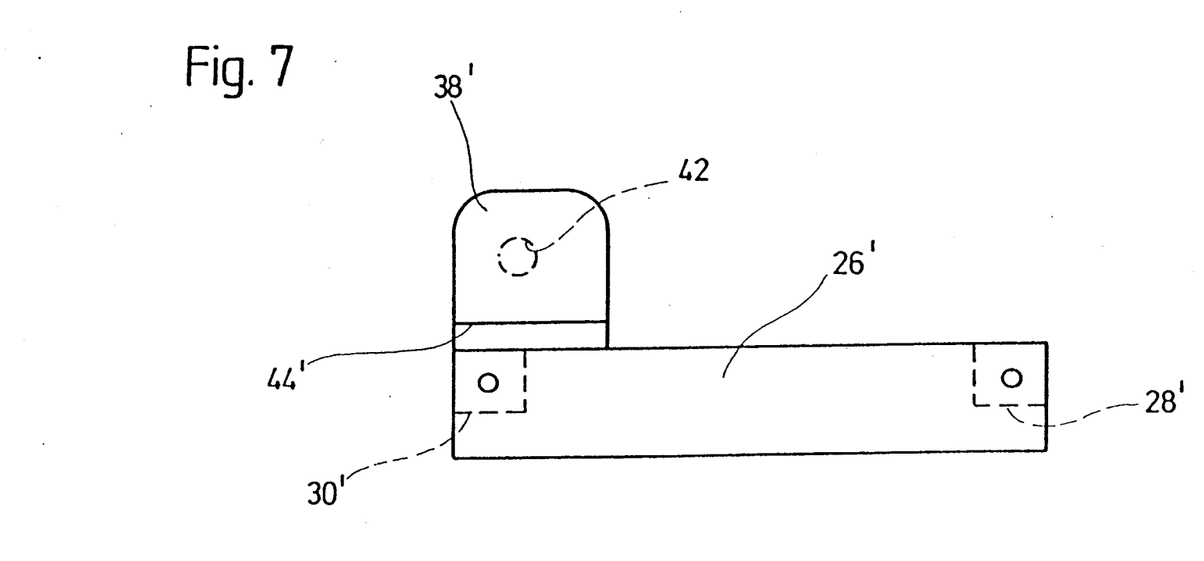
FIG. 7 is a side elevation of the two roller support halves in their assembled configuration, without the pivot member.

Referring now to FIG. 6, support block 24 forms a chassis configured as two symmetrically constructed U-shaped frame sections, the spaced apart limbs of which, 28, 30 and 28', 30', respectively, are connected with one another by bight portions 26, 26', and are brought into mutual engagement by engagement knobs 32. U-limbs 28, 30 and 28', 30' are connected solidly with one another by blind rivets 34 and 36 as in shown in FIG. 3. U-limbs 30, 30' each include an upwardly projecting support bracket 38, 38', respectively. As is also shown in FIG. 3, borehole 40, and blind borehole 42, are transversely disposed in support brackets 38, 38' respectively. Borehole 40 and blind borehole 42 are arranged to be coaxial to each other. Longitudinal grooves 44, 44', extend along the outside of U-limbs 30 and 30' as seen in FIG. 8. Longitudinal grooves 44, 44', enable support block 24 to be slidingly inserted into longitudinal groove 22, with groove projections 46, 46' fitting into longitudinal grooves 44, 44' respectively to prevent movement of support block 24 upwardly out of longitudinal groove 22.

Figure 4:
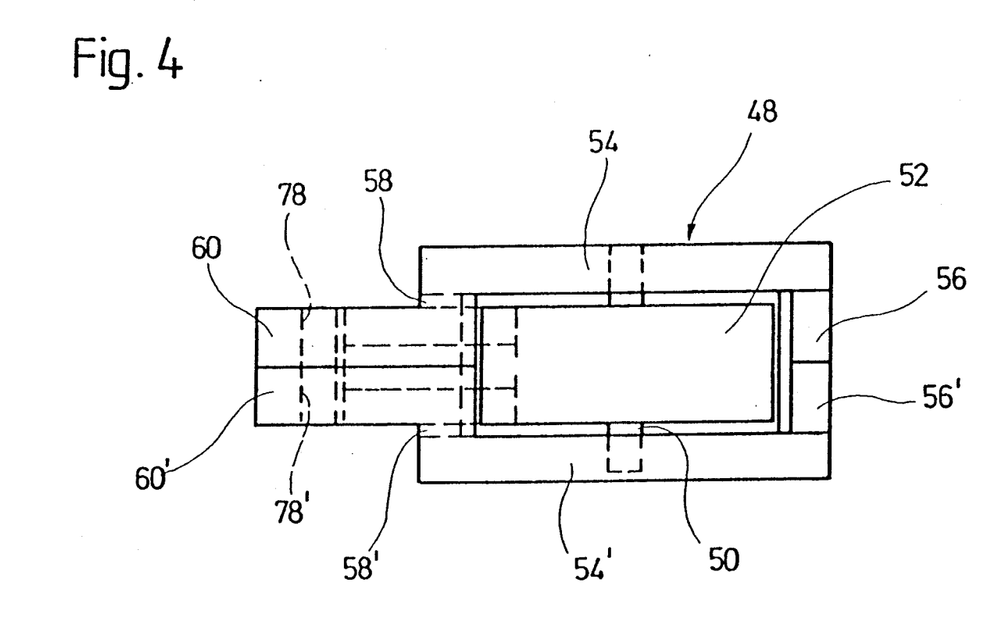
FIG. 4 is a top plan view of the roller support and roller assembly, according to the preferred embodiment of the invention, in their assembled configuration.
Figure 5:
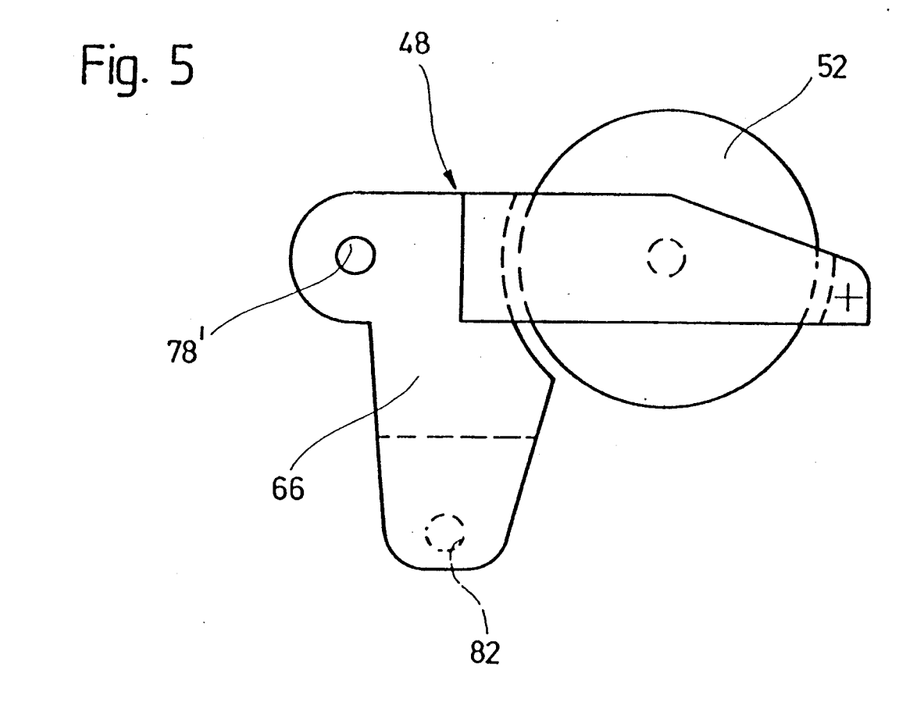
FIG. 5 is a side elevation of the pivot member and roller, in their assembled configuration.

Within support block 24, a pivot member in the form of angled lever 48 is arranged so as to be pivotable around an axis defined by borehole 40, and blind borehole 42. Lever 48 forms a framework having two symmetrical halves, as seen in FIG. 4. The two halves of lever 48 hold roller shaft 50 upon which roller 52 is supported in a rotatable manner. As will be hereinafter further described, roller shaft 50 extends transversely to longitudinal groove 22, when support block 24 has been inserted into longitudinal groove 22. Lever 48 is formed from mated longitudinal frame members 54, 54'. Longitudinal frame members 54, 54' have, at one end, transverse frame sections 56, 56', respectively, and at another end, transverse frame sections 58, 58'. From transverse frame sections 58, 58' emanate support brackets 60, 60', which extend along the directions of longitudinal frame members 54, 54'. As is best illustrated in FIG. 3, arms 62, 62', extended downwardly from support brackets 60, 60', respectively. Both arms 62, 62' are, at their free ends, formed with flat sides 64, 64' facing one another, so that when lever 48 is assembled, arms 62, 62' form angled arm 66, the free end of which, as seen in FIG. 8, comprises two forked limbs 68 and 70. Both halves of lever 48 can, in the manner of the halves of support block 24, be pressed together and joined through engagement knobs 72 fitting into blind boreholes 74, and can be secured to one another through blind rivets 76, penetrating transverse frame sections 56, 56' simultaneously.

Support brackets 60, 60' are penetrated by boreholes 78, 78', respectively, which extend coaxially to one another. Similarly, blind borehole 82 of forked limb 68 is coaxially coordinated with borehole 80 of forked limb 70. Further, borehole 84 extends through longitudinal frame member 54 and is aligned with blind borehole 86, disposed in longitudinal frame member 55'. Borehole 84 and blind borehole 86 accommodate roller shaft 50, for the rotational support of roller 52.

In the above described preferred embodiment of the invention, the symmetrical division of support block 24 and pivot member 48 presents an advantageous mounting of roller support 18, within longitudinal groove 22. Firstly, roller shaft 50 is inserted into roller 52, after which the ends of roller shaft 50, which project past the sides of roller 52, are inserted into borehole 84 and blind borehole 86 of longitudinal frame members 54 and 54'. Simultaneously, longitudinal frame members 54 and 54' are placed together and secured together with blind rivet 76. Subsequently, the halves of support block chassis 24 are placed together and affixed with blind rivets 34 and 36 respectively. Thereafter, assembled lever framework 48 is inserted into support block 24, with support brackets 60 and 60' being positioned between support brackets 38 and 38'. Boreholes 78, 78' are aligned with boreholes 40 and 42, and pivot shaft 88 is inserted through aligned boreholes 40, 78, 78' and into aligned blind borehole 42 and is then secured, in any known manner. Upon assembly, pivot member 48 may then be pivoted around pivot shaft 88, relative to support block 24.

Figure 9:
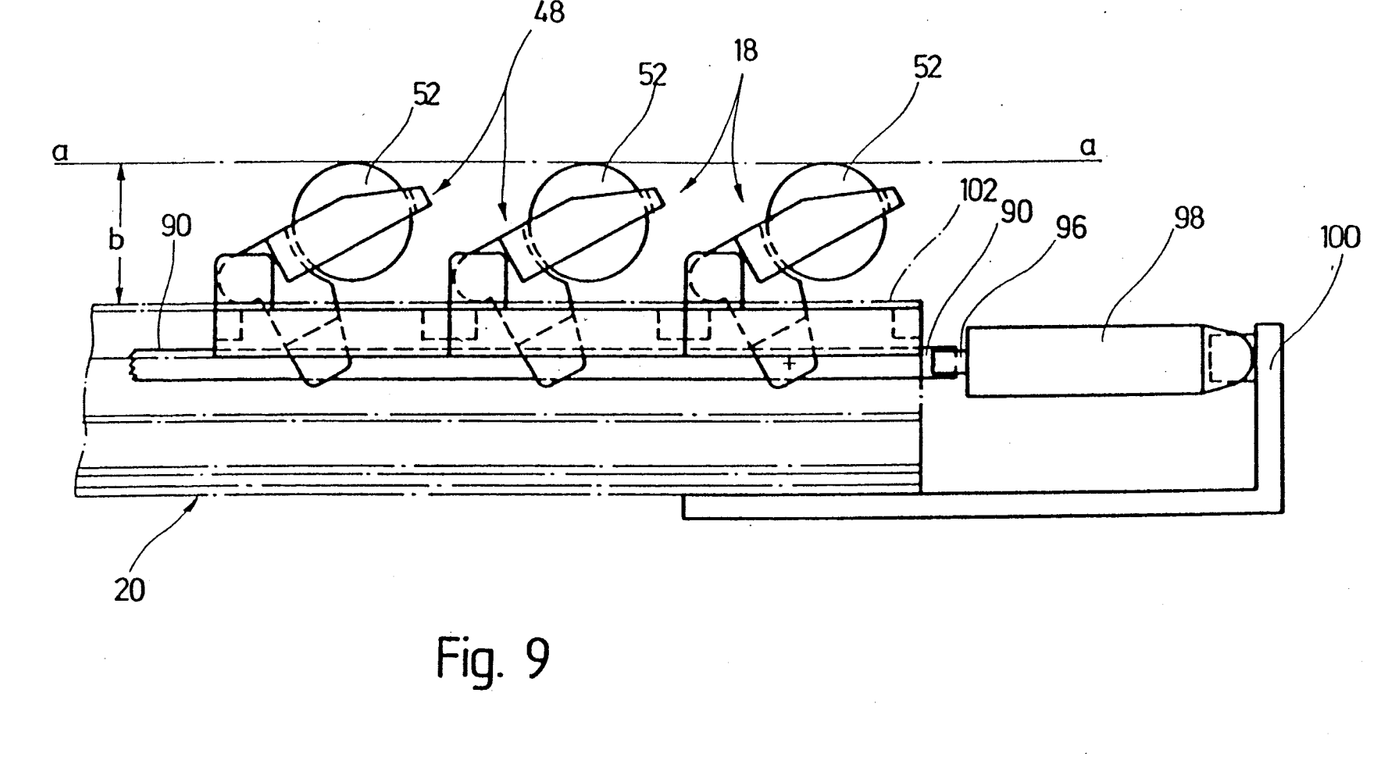
FIG. 9 is a partial side elevation of a support rail having roller bearing devices, according to a preferred embodiment of the present invention, showing the rollers in their elevated position.

In a preferred embodiment of the invention, as shown in FIGS. 8 and 9, a number of the roller supports 18, assembled as described hereinabove, will be arranged consecutively within one or more support rails 20, and operably configured to be raisable or lowerable in unison. In order to enable the rollers to be raisable or lowerable, the following construction may be utilized. Adjustment bar 90, which, in the preferred embodiment of the invention is rectangular, is passed between forked limbs 68 and 70 of angle arm 66 of each roller support 18 to be mounted in support rail 20. Adjustment bar 90 includes one or more transversely extending boreholes 94, (see FIGS. 3 and 8) for each roller support 18 to be mounted. For each roller support 18, boreholes 80 and 82 of forked limbs 68 and 70 are aligned with a borehole 94 of adjustment bar 90, and a connecting pin 92 is passed through the aligned holes and secured in any suitable manner.

Figure 10:
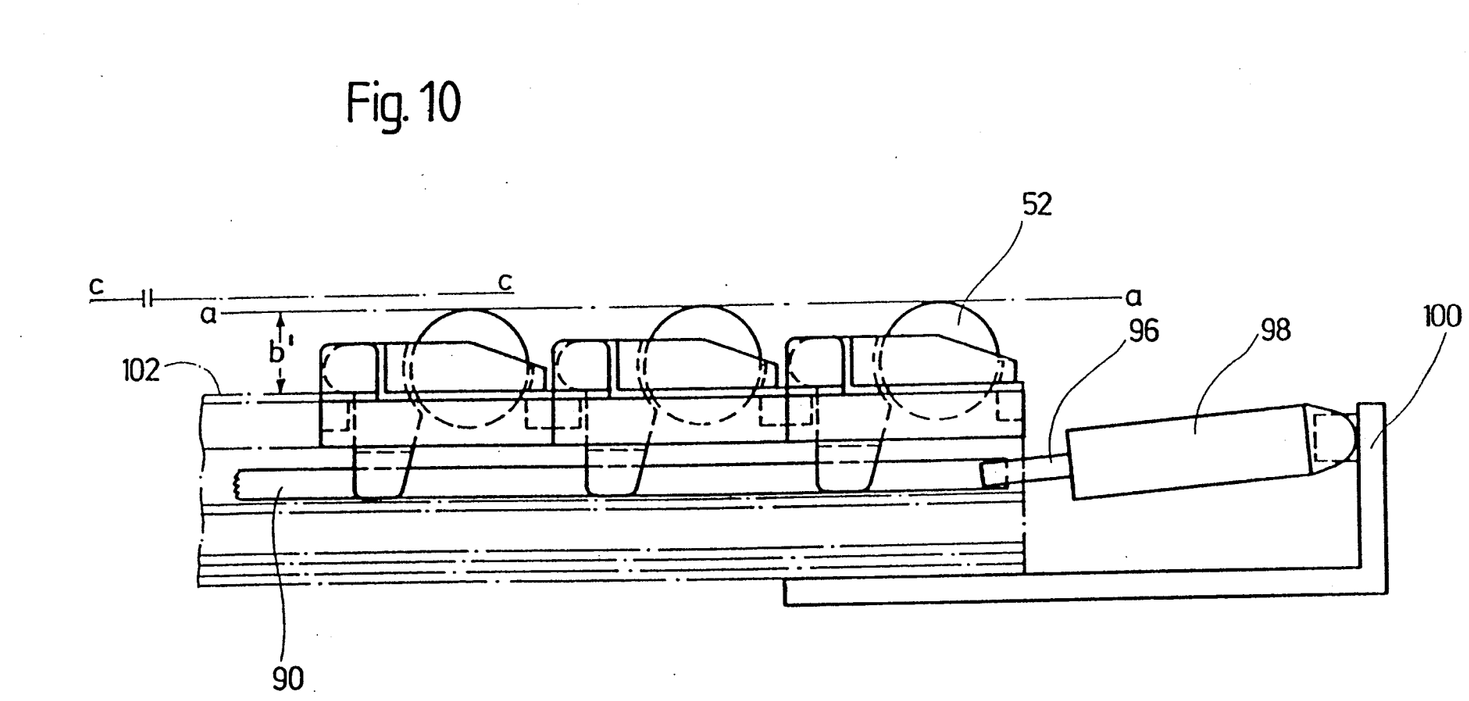
FIG. 10 is a partial side elevation, according to FIG. 9, in which the rollers are shown in their lower position.

Assembled roller supports 18, articulated with adjustment bar 90, are then inserted into longitudinal groove 22 of support rail 20, with roller 52 extending upward through the longitudinal opening of support rail 20. A free end of adjustment bar 90 is then connected, in a pivotable manner to a reciprocating device for driving the adjustment bar 90 back and forth along longitudinal groove 22, in a selective manner. The reciprocating device may take any suitable form. For example, in the preferred embodiment of the invention, the reciprocating device includes a pneumatic cylinder 98, as seen in FIG. 9 and 10 affixed to a support 100, which is fixed in relation to support rail 20. Projecting from an end of pneumatic cylinder 98, toward support rail 20, is piston rod 96, which is connected in a pivotable manner to the free end of adjustment bar 90. As will become apparent in the following description, it is important that longitudinal groove 22 and support rail 20 have sufficient height to enable adjustment bar 90 to undergo limited vertical movement.

As can be seen in FIGS. 9 and 10, a workpiece transfer plane, indicated by the line a—a, is defined by the upper surfaces of rollers 52, which are shown in FIG. 9 in their elevated position. Rollers 52 can be displaced downwardly, through the corresponding pivoting of pivot members 48 of roller supports 18, in such a manner that the height "b" (seen in FIG. 9) can be reduced to the height "b'" (shown in FIG. 10). The lowering of rollers 52 is accomplished through the displacement of adjustment bar 90 from the right to the left as seen in FIGS. 9 and 10.

Although, in a preferred embodiment of the invention, the raising or lowering of the movable rollers is accomplished in the manner previously described, the raising or lowering of the rollers may be accomplished through alternate means. For example, the pivot members may be moved through the use of a screw thread of a spindle which comprises the adjustment means.

The construction of the support rail 20 and roller supports 18 could be further modified so that upon pivoting of pivot members 48, no portion of the roller supports 18 or rollers 52 would project above the top surfaces of support rails 20. In such a construction, a roller workpiece transfer platform can be readily converted to a workpiece sliding platform.

In order to provide a workpiece transfer platform capable of enabling the transfer of a workpiece in two successive substantially perpendicular directions, as seen in FIG. 2, a series of support rails 20 equipped with the previously described vertically adjustable roller supports and roller, would be provided in alternating relation with workpiece transfer platform 16, having roller supports 106 with vertically fixed rollers 104. The particular configuration of workpiece transfer platform 16 is not critical to the operation of the present invention. As an example, workpiece support platform 16 might be comprised of a number of parallel, spaced support rails extending parallel to support rails 20, with roller supports holding rollers having axes of rotation extending parallel to the support rails, such as suggested by U.S. Pat. No. 4,738,345, FIG. 7. However, no matter how workpiece transfer platform 16 may be configured, the axes of rotation of vertically fixed rollers 104 must extend parallel to the longitudinal axes of support rails 20.

To assure proper operation of the workpiece transfer platform, the plane of the upper surfaces of rollers 52 in roller supports 18 must be higher, in their raised position, than the plane of the upper surfaces of rollers 104 of roller supports 106, which plane is designated in FIG. 1 by line c—c. When adjustable rollers 52 are raised, a workpiece plate may be moved from plate saw 10, as seen in FIG. 2, along workpiece transfer platform 14, toward workpiece transfer platform 16 without contacting any of vertically fixed rollers 104 of roller supports 106. Once the workpiece plate is in its desired position in front of plate saw 12, then the reciprocating device, such as pneumatic cylinder 98, as previously described, will be actuated, moving adjustment bar 90 along longitudinal groove 22, causing pivot members 48 to pivot lowering rollers 52 below plane c—c of the top surfaces of rollers 104. A workpiece plate, which during the foregoing process has been lowered on top of rollers 104 may then be propelled in the substantially transverse direction to support rail 20, toward plate saw 12, without contacting rollers 52, thus avoiding possible damage to the workpiece plate.

The foregoing description and drawings merely explain and illustrate the invention and the invention is not limited thereto accept insofar as the appended Claims are so limited, as those skilled in the art who have the disclosure before them will be able to make modifications and variations therein without departing from the scope of the invention.

What is claimed is:

1. A roller bearing device for use in a workpiece transfer platform, said transfer platform including at least one support rail having a groove extending along a longitudinal axis of said support rail, said groove, having an opening along a top surface of said support rail, said roller bearing device comprising:

at least one roller support insertable into said groove, said roller support including a pivot member, said pivot member formed as a lever having two arms, a first arm positionable substantially parallel to said longitudinal axis and along said top surface of said support rail, a second arm disposed at an angle to said first arm and extending generally downward therefrom, said lever further being supported by a chassis divided along the direction of said longitudinal axis into two support halves operably joinable in cooperating mated relation to each other, said two support halves supporting the lever therebetween in a substantially freely pivotable manner about an axis extending parallel to a predetermined plane positioned above and parallel to said top surface of said support rail;

a roller rotatably mounted upon a portion of said pivot member, on said first arm thereof for rotation about an axis extending perpendicular to said longitudinal axis, at least a portion of said roller positionable above said top surface of said support rail; and adjustment means articulated to said pivot member for enabling the selective repositioning of said roller upwardly or downwardly relative to said predetermined plane positioned above and parallel to said top surface of said support rail, by enabling said lever to be pivoted about said axis parallel to said predetermined plane, upon actuation of said adjustment means.

2. The roller bearing device according to claim 1 wherein said pivot member further comprises:

a framework divided along the direction of said longitudinal axis into two pivot member halves operably joinable in cooperating mated relation to each other; and said pivot member halves supporting said roller therebetween in a substantially freely rotatable manner.

3. The roller bearing device according to claim 2 wherein said adjustment means comprises:

an activating bar operably arranged in said groove for displacement substantially parallel to said longitudinal axis.

4. The roller bearing device according to claim 5 wherein said adjustment means comprises:

an activating bar operably arranged in said groove for displacement substantially parallel to said longitudinal axis.

5. A roller bearing device for use in a workpiece transfer platform, said transfer platform including at least one support rail having a groove extending along a longitudinal axis of said support rail, said groove having an opening along a top surface of said support rail, said roller bearing device comprising:

at least one roller support insertable into said groove, said roller support including a pivot member, a roller rotatably mounted upon a portion of said pivot member, for rotation about an axis extending perpendicular to said longitudinal axis, a chassis, for supporting said pivot member, divided along the direction of said longitudinal axis into two support halves operably joinable in cooperating mated relation to each other;

said two support halves supporting said pivot member therebetween in a substantially freely pivotable manner, about an axis extending parallel to a predetermined plane positioned above and parallel to said top surface of said support rail, adjustment means articulated to said pivot member for enabling the selective repositioning of said roller upwardly or downwardly relative to said predetermined plane positioned above and parallel to said top surface of said support rail.

6. The roller bearing device according to claim 5 wherein said pivot member comprises:

a framework divided along the direction of said longitudinal axis into two pivot member halves operably joinable in cooperating mated relation to each other; and said pivot member halves supporting said roller therebetween in a substantially freely rotatable manner.

7. A workpiece transfer platform arrangement for the transfer of workpiece plates from a first transport direction to a second transport direction substantially perpendicular to the first transport direction; said workpiece transfer platform arrangement comprising:

a first workpiece transfer platform including at least one support rail positioned in a first predetermined plane, and having a groove extending along a longitudinal axis of said support rail, said groove including an opening along a top surface of said support rail, and at least one roller bearing device operably associated with said support rail, said roller device having at least one roller support seated in said groove, said roller support including a pivot member, formed as a lever having two arms, a first arm positionable substantially parallel to said longitudinal axis and along said top surface of said support rail, a second arm disposed at an angle to said first arm and extending generally downward therefrom, a chassis, for supporting said lever, divided along the direction of said longitudinal axis into two support halves operably joinable in cooperating mated relation to each other, said two support halves supporting the lever therebetween in a substantially freely pivotable manner, about an axis extending parallel to a second predetermined plane positioned above and parallel to said top surface of said support rail, a roller rotatably mounted upon a portion of said pivot member, on said first arm thereof, for rotation around an axis perpendicular to said longitudinal axis, a portion of said roller positionable above the top surface of said support rail, and adjustment means articulated to said pivot member for enabling said roller to be selectively repositioned upward or downward relative to said second predetermined plane positioned above and parallel to said top surface of said support rail, by enabling said lever to be pivoted about an axis parallel to said first predetermined plane, upon actuation of said adjustment means; and a second workpiece transfer platform including at least one support rail positioned in said first predetermined plane, having a groove extending along a longitudinal axis of said support rail, said groove having an opening along a top surface of said support rail and at least one roller bearing device associated with said support rail, said roller bearing device having at least one roller supported for rotation about an axis extending parallel to said longitudinal axis of said support rail, said roller being positioned within said second predetermined plane positioned above said top surface of said support rail of said first workpiece transfer platform, said at least one support rail of said second workpiece transfer platform being disposed in spaced parallel relation to said at least one support rail of said first workpiece transfer platform, and in overlapping lengthwise relation to at least a portion of said support rail of said first workpiece transfer platform, whereby a workpiece plate may be transferred along said first workpiece transfer platform along said longitudinal axis, when said roller is raised above said second predetermined plane, until said workpiece plate is above said second workpiece transfer platform, and said workpiece plate may then be transferred perpendicularly to said longitudinal axis when said roller is lowered below said second predetermined plane.

8. The roller bearing device according to claim 7 wherein said pivot member further comprises:

a framework divided along the direction of said longitudinal axis into two pivot member halves operably joinable in cooperating mated relation to each other; and said pivot member halves supporting said roller therebetween in a substantially freely rotatable manner.

9. The roller bearing device according to claim 8 wherein said adjustment means comprises:

an activating bar operably arranged in said groove for displacement substantially parallel to said longitudinal axis.

10. A workpiece transfer platform arrangement for the transfer of workpiece plates from a first transport direction to a second transport direction substantially perpendicular to the first transport direction, said workpiece transfer platform arrangement comprising:

a first workpiece transfer platform including at least one support rail positioned in a first predetermined plane, and having a groove extending along a longitudinal axis of said support rail, said groove including an opening along a top surface of said support rail, and at least ne roller bearing device operably associated with said support rail, said roller bearing device having at least one roller support seated in said groove, said roller support including a pivot member, and a chassis, for supporting said pivot member, divided along the direction of said longitudinal axis into two support halves operably joinable in cooperated mating relation to each other, said two support halves supporting said pivot member therebetween in a substantially freely pivotable manner, about an axis extending parallel to a second predetermined plane positioned above and parallel to said top surface of said support rail, a roller rotatably mounted upon a portion of said pivot member for rotation around an axis perpendicular to said longitudinal axis, a portion of said roller positionable above the top surface of said support rail, and adjustment means articulated to said pivot member for enabling said roller to be selectively repositioned upward or downward relative to said second predetermined plane positioned above and parallel to said the top surface of said support rail; and a second workpiece transfer platform including at least one support rail positioned in said first predetermined plane, having a groove extending along a longitudinal axis of said support rail, said groove having an opening along a top surface of said support and at least one roller bearing device associated with said support rail, said roller bearing device having at least one roller supported for rotation about an axis extending parallel to said longitudinal axis of said support rail, said roller being positioned within said second predetermined plane position above said top surface of said support rail of said first workpiece transfer platform, said at least one support rail of said second workpiece transfer platform being disposed in spaced parallel relation to said at least one support of said first workpiece transfer platform, and in overlapping lengthwise relation to at least a portion of said support rail of said first workpiece transfer platform, whereby a workpiece plate may be transferred along said first workpiece transfer platform along said longitudinal axis, when said roller is raised above said second predetermined plane, until said workpiece plate is above said second workpiece transfer, platform and said workpiece plate may then be transferred perpendicularly to said longitudinal axis when said roller is lowered below said second predetermined plane.

11. The roller bearing device according to claim 10 wherein said pivot member comprises:

a framework divided along the direction of said longitudinal axis into two pivot member halves operably joinable in cooperating mated relation to each other; and said pivot member halves supporting said roller therebetween in a substantially freely rotatable manner.

* * * * *

UNITED STATES PATENT AND TRADEMARK OFFICE
CERTIFICATE OF CORRECTION

PATENT NO. : 5,042,633

DATED : August 27, 1991

INVENTOR(S) : Jenkner

It is certified that error appears in the above-identified patent and that said Letters Patent is hereby corrected as shown below:

Col. 1, Line 64          Delete "could possible" and insert instead -- could possibly --

Col. 2, Line 11          Delete "bearing devices" and insert instead -- bearing device --

Col. 2, Line 17          Delete "other object" and insert instead -- other objects --

UNITED STATES PATENT AND TRADEMARK OFFICE
CERTIFICATE OF CORRECTION

PATENT NO. : 5,042,633

DATED : August 27, 1991

INVENTOR(S) : Jenkner

It is certified that error appears in the above-identified patent and that said Letters Patent is hereby corrected as shown below:

| | |
|---|---|
| Col. 2, Line 43 | Delete "a axis" and insert instead -- an axis -- |
| Col. 7, Line 56 | Delete "groove, having" and insert instead -- groove having -- |
| Col. 8, Line 35 | Delete "claim 5" and insert instead -- claim 1 -- |
| Col. 10, Line 36 | Delete "least ne" and insert instead -- least one -- |

Signed and Sealed this

Twelfth Day of January, 1993

Attest:

DOUGLAS B. COMER

Attesting Officer

Acting Commissioner of Patents and Trademarks